US006831529B1

(12) United States Patent
Devoe et al.

(10) Patent No.: US 6,831,529 B1
(45) Date of Patent: Dec. 14, 2004

(54) FEED-THROUGH FILTER CAPACITOR ASSEMBLY

(76) Inventors: Lambert Devoe, 3446 Stadium Pl., San Diego, CA (US) 92122; Alan Devoe, 5715 Waverly Ave., La Jolla, CA (US) 92037

( * ) Notice: Subject to any disclaimer, the term of this patent is extended or adjusted under 35 U.S.C. 154(b) by 66 days.

(21) Appl. No.: 10/441,476

(22) Filed: May 20, 2003

(51) Int. Cl.[7] .............................. H03H 7/00; H01G 4/35
(52) U.S. Cl. .................... 333/182; 333/185; 333/184; 304/302; 361/302; 361/303; 361/304; 361/305
(58) Field of Search ................................. 333/182, 185, 333/184, 175; 361/302, 303, 304; 304/302

(56) References Cited

U.S. PATENT DOCUMENTS

| | | | | |
|---|---|---|---|---|
| 4,148,003 A | | 4/1979 | Colburn et al. ............. 333/181 |
| 5,040,091 A | | 8/1991 | Yamaoka et al. ........... 361/302 |
| 5,611,884 A | | 3/1997 | Bearinger et al. .......... 156/325 |
| 5,825,068 A | | 10/1998 | Yang ........................... 361/302 |
| 5,825,608 A | * | 10/1998 | Duva et al. .................. 361/302 |
| 5,905,627 A | * | 5/1999 | Brendel et al. ............. 333/182 |
| 5,999,398 A | * | 12/1999 | Makl et al. .................. 361/302 |
| 6,277,169 B1 | | 8/2001 | Hampden-Smith et al. ... 75/336 |
| 6,414,835 B1 | * | 7/2002 | Wolf et al. .................. 361/302 |
| 6,453,551 B1 | | 9/2002 | Nordquist et al. ............. 29/862 |
| 6,490,148 B1 | | 12/2002 | Allen et al. .................. 361/302 |
| 6,551,676 B1 | | 4/2003 | Yamakawa et al. ........ 428/40.1 |
| 6,555,762 B2 | | 4/2003 | Appelt et al. ................ 174/264 |
| 6,619,763 B2 | * | 9/2003 | Trinh et al. .................. 361/302 |
| 6,778,040 B2 | * | 8/2004 | Kim ............................ 333/182 |

* cited by examiner

*Primary Examiner*—Michael Tokar
*Assistant Examiner*—Lam T. Mai
(74) *Attorney, Agent, or Firm*—Wood, Herron & Evans, LLP

(57) ABSTRACT

A feed-through filter capacitor assembly using an electrically conductive adhesive modified with a filler of low coefficient of thermal expansion (CTE) to provide a conductive relation between the conductive pin and the electrode plates of the ceramic capacitor. The conductive adhesive contains an organic polymer-based adhesive component that has a CTE greater than the CTE of the capacitor ceramic body and a conductive metal filler having a CTE lower than the adhesive component. The conductive adhesive is further provided with a CTE-lowering filler that has a CTE lower than the CTE of the conductive metal filler, thereby lowering the overall CTE of the adhesive to a value closer to the CTE of the capacitor ceramic body.

36 Claims, 1 Drawing Sheet

FEED-THROUGH FILTER CAPACITOR ASSEMBLY

FIELD OF THE INVENTION

The present invention relates to feed-through filter capacitor assemblies, and more particularly to the conductive adhesive connection between the ceramic capacitor and the conductive pin passing through a feed-through passage in the capacitor.

BACKGROUND OF THE INVENTION

Feed-through filters are utilized to separate unwanted interference from a signal path, for example in connection with implantable medical devices, such as heart pacemakers and the like. These electronic devices are often constructed having an outer housing in which the necessary electronic components are contained. For implantable devices, the outer housing must be formed of a material that is biocompatible and capable of shielding the electronics within the housing from external sources of electromagnetic interference (EMI). Titanium is often used to satisfy these dual requirements of shielding and biocompatibility. A conductive wire or pin extends from the electronics within the outer housing to a desired external location, such as one inside the body. The conductive wire may act as an antenna picking up spurious radio frequency signals that interfere with proper operation of the device, such that a filtering capacitor is desirable. A small capacitor is fitted in an annular space formed between a conductive housing (ferrule) and the conductive pin. The capacitor is formed from a dielectric ceramic and two sets of electrode plates, wherein one set of plates is electrically connected to the conductive pin and the other set of plates is electrically connected with the conductive housing. For some applications, however, there is no outer housing, such as with a connector cable. Regardless, the electrical connection between the conductive pin and the capacitor electrode plates is generally achieved by means of a solder, an electrically conductive adhesive material or brazing. The use of an organic polymeric-based conductive adhesive is preferable, but in use, cracking in the capacitor body has been observed. Because polymeric materials exhibit shrinkage during curing, tension is placed on the ceramic body in the area of the feed-through passage. That tension, if sufficiently high, can crack the capacitor body.

Thus, there is a need to enable the use of conductive adhesives for electrically connecting the capacitor with the conductive pin in a feed-through filter capacitor assembly without cracking the capacitor body during curing.

SUMMARY OF THE INVENTION

100041 The present invention provides a feed-through filter capacitor assembly in which an electrically conductive adhesive modified with a filler of low coefficient of thermal expansion (CTE) is used to provide the conductive relation between the conductive pin and the electrode plates of the ceramic capacitor. A feed-through filter capacitor has a ceramic body and first and second sets of electrode plates. At least one internal passageway is formed through the ceramic body and a conductive pin passes through each passageway in conductive connection with the first set of electrode plates. An electrically conductive adhesive in the passageway provides the conductive connection. The conductive adhesive comprises an organic polymer-based adhesive component that has a CTE greater than the CTE of the capacitor ceramic body and a conductive metal filler to provide the electrical connection between the conductive pin and the electrode plates. In accordance with the present invention, the conductive adhesive is further provided with a CTE-lowering filler that has a CTE lower than the CTE of the conductive metal filler. This low CTE filler effectively lowers the overall CTE of the adhesive to a value closer to the CTE of the capacitor ceramic body. By lowering the CTE of the adhesive, less shrinkage occurs during curing, and therefore, less tension is placed on the capacitor body, thereby reducing the likelihood of cracking the capacitor body.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
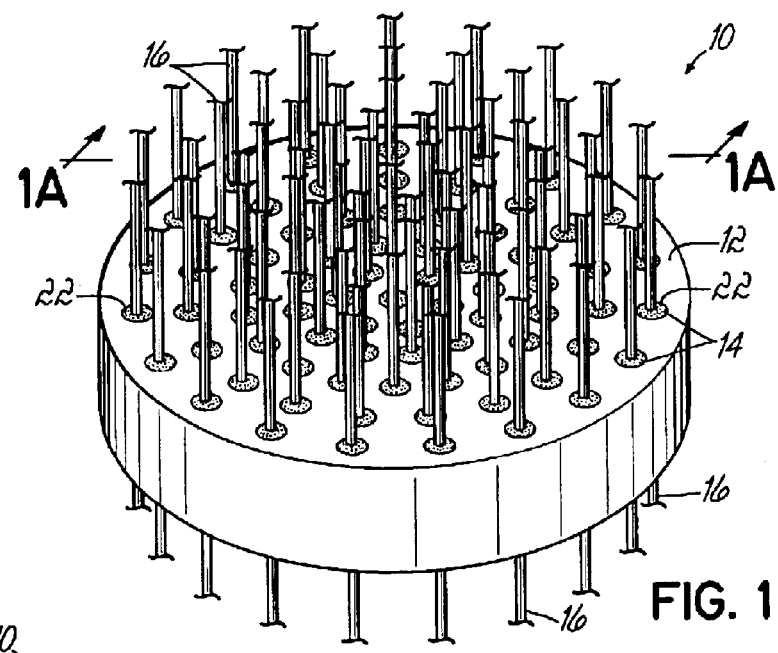
FIG. 1 is a perspective view depicting a multiple-hole feed-through filter capacitor array of the present invention.
Figure 1A:
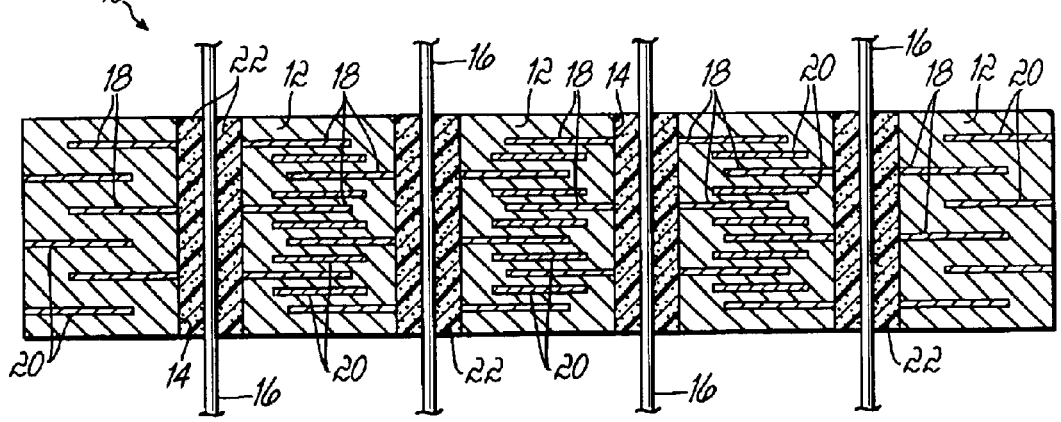
FIG. 1A is a cross-section taken generally along line 1A of FIG. 1 and further depicting the adhesive bond between the capacitor body and conductive pin.

With reference to FIGS. 1 and 1A, a feed-through filter capacitor assembly 10 is depicted in top perspective view in FIG. 1 and in cross-sectional view, taken generally along line 1A, in FIG. 1A. A capacitor 10 is shown having a ceramic body 12 with multiple feed-through passages 14 thereby providing a feed-through capacitor array. A conductive pin 16 carrying the electrical signal to be filtered passes through each internal passage 14 of the feed-through filter capacitor 10. The filter capacitors on each pin 16 includes a ceramic body 12 and a set of electrode plates 18 associated with each of the multiple internal passages extending through the ceramic body 12 and in opposition to grounded plate 20 conductively connected to an electrical ground. The electrode plates 18 associated with each respective internal passageway 14 are in conductive connection with the conductive pin passing through the respective passageway 14. To provide the conductive connection, the internal passageways 14 in the ceramic body 12 are filled with an electrically conductive adhesive 22 in accordance with the present invention.

Figure 2:
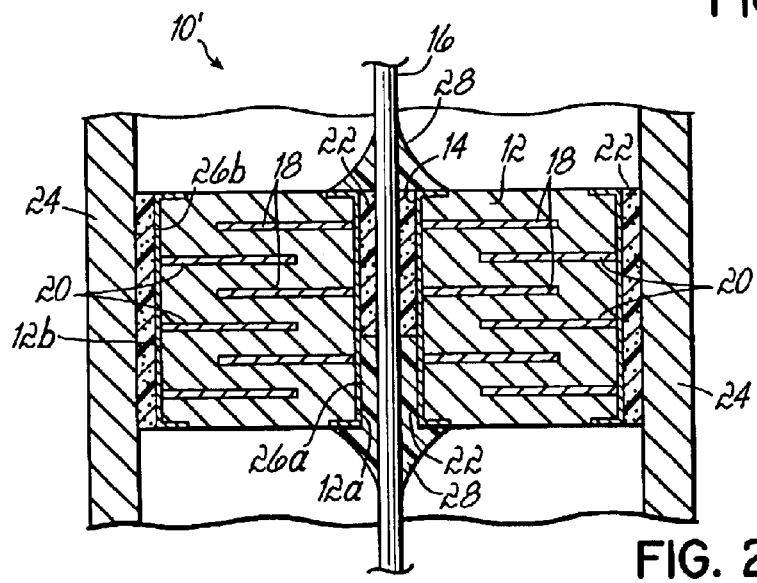
FIG. 2 depicts in cross-section a single-hole feed-through filter capacitor assembly of the present invention.

With reference to FIG. 2, a feed-through filter capacitor assembly 10' is depicted in cross-section. The capacitor is shown having a single feed-through passage 14, and thus, it should be understood that both single and multiple feed-through assemblies are contemplated by the present invention. In the single feed-through embodiment, a single conductive pin 16 carrying the electrical signal to be filtered passes through a single internal passage 14 of a feed-through filter capacitor 10'. As with the embodiment in FIGS. 1–1A, the filter capacitor 10' includes a ceramic body 12 and first and second sets 18, 20 of electrode plates. FIG. 2 further depicts the ceramic body 12 residing in a conductive housing 24 and the conductive pin 16 passes through that housing 24 in a non-conductive relation, i.e., the conductive pin 16 is insulated from the conductive housing 24. The first set 18 of electrode plates is in conductive relation with the conductive pin 16. The second set 20 of electrode plates is in conductive relation with the conductive housing 24. In this embodiment, the internal surface 12a of the ceramic body 12 is surfaced with a conductive metal (metallization layer) 26a to provide electrical contact to the first set 18 of electrode plates, and the external surface 12b of the ceramic body 12 is also surfaced with a conductive metal (metallization layer) 26b to provide an electrode contact to the second set 20 of internal electrode plates. However, the conductive housing 24 and metallization layers 26a, 26b are not essential to the present invention, as shown in FIGS. 1 and 1A. To provide the conductive relation between the first set 18 of electrode plates and the conductive pin 16, the internal passageway 14 in the capacitor is filled with an electrically conductive adhesive 22. A non-conductive adhesive 28 may also be provided in the bottom of the internal passageway 14, for example, to prevent shorting the device, and outside the passageway 14 between the conductive housing 24 and the conductive pin 16 and adhesive 22 to provide insulation therebetwveen. For any non-conductive adhesive 28 residing in the internal passageway, the adhesive 28 advantageously comprises an adhesive component and a CTE-lowering filler, as described herein for the conductive adhesive 22. The CTE-lowering filler has a CTE lower than the adhesive component to thereby lower the total CTE for the non-conductive adhesive.

Conductive adhesives typically comprise an adhesive component and conductive metal filler. The adhesive component is an organic polymer-based material, such as thermoplastics (e.g., polyamides), thermosetting resins, UV-light curing adhesives, epoxies, silicones, etc. An exemplary adhesive component is epoxy. Conductive metal fillers may include silver, palladium, platinum, copper, gold or other noble metals, or combinations thereof. In accordance with the present invention, the conductive adhesive is modified by adding a low CTE filler to reduce the CTE of the conductive adhesive. To this end, a filler, which is understood to refer to relatively non-adhesive substances added to an adhesive to improve one or more qualities of the adhesive, is selected that has a CTE lower than the CTE of the adhesive component and of the conductive metal filler. The total CTE of the conductive adhesive is a volume fraction average of the materials contained in the conductive adhesive, such that adding the low CTE filler has the effect of lowering the total CTE for the adhesive. Because the CTE of the ceramic body is significantly lower than that of the adhesive component, the present invention achieves a decrease in the thermal expansion mismatch between the adhesive and the ceramic body, thereby decreasing the tension during curing, and consequently, reducing the potential for cracking the ceramic body.

In general, the CTE of ceramics typically used for the capacitor body have a CTE generally in the range of about 3–15 ppm/° C. For example, barium titanate has a CTE of about 10–12 ppm/° C. In contrast, the adhesive component has a CTE of at least about 50 ppm/° C., and typically in the range of about 50–150 ppm/° C. For example, the CTE is on the order of 100 ppm/° C. for epoxy. The conductive metal fillers typically used have CTE's that are lower than the CTE of the adhesive component, generally in the range of about 14–20 ppm/° C. By way of example, silver has a CTE of about 19 ppm/° C. For a conductive adhesive containing 75 vol. % epoxy (assume CTE=100 ppm/° C.) and 25 vol. % silver (CTE=19 ppm/° C.), the total CTE of the adhesive is about 79.75 (i.e., 100×0.75+19×0.25). Thus, adding the conductive metal filler effectively lowers the CTE from that of the adhesive component. By further modifying the adhesive with a filler having a CTE lower than the CTE of the conductive metal filler, the total CTE for the conductive adhesive is effectively lowered even further from that of the adhesive component, which brings the total CTE closer to the CTE of the capacitor body. In the example above of epoxy with 25 vol. % silver, the further addition of 25 vol. % fused silica having a CTE of 0.5 ppm/° C. lowers the total CTE to about 54.875 ppm/° C. (100×0.5+19×0.25+0.5×0.25).

The CTE of the CTE-lowering filler is less than the CTE's of the adhesive component and conductive metal filler and is less than about 15 ppm/° C. Advantageously, the low CTE filler has a CTE lower than the CTE of the ceramic body. In one embodiment of the present invention, the low CTE filler is fused silica (a specific type of glass), which has a CTE on the order of 0.4–0.6 $\mu$ppm/° C. Because fused silica has a CTE significantly lower than that of the ceramic body, it is highly effective at lowering the CTE of the entire adhesive toward that of the capacitor. In another embodiment of the present invention, the low CTE filler is a ceramic, such as barium titanate, alumina, zirconia or quartz, or a glass. These materials generally have a CTE similar to that of the capacitor body such that adding these materials to the conductive adhesive moves the average CTE closer to that of the capacitor. In yet another embodiment of the present invention, the low CTE filler may be an alloy designed to have a low or no CTE within a reasonable temperature range. Binary and ternary alloys of iron may be suitable, in particular those having about 30–70 wt. % iron alloyed with nickel, chromium, cobalt or a combination thereof. The impurity content of these alloys is generally less than about 1%, with typical impurities including manganese, silicon and carbon. The binary Fe—Ni family having about 30–60 wt. % nickel is exemplary. INVAR®, which is Fe—36Ni, is designed to have essentially no CTE, and thus would have a strong effect of lowering the CTE of the entire conductive adhesive. Exemplary ternary alloys having about 30–70% iron include Fe—Ni—Cr, Fe—Ni—Co and Fe—Cr—Co alloys, such as 52Fe—36Ni—12Cr, 33–34Fe—32Ni—4–5Co, 54Fe—29Ni—17Co, and 36.5–37Fe—53–54.5Co—9–10Cr. Other metal alloys may have low CTE's below about 15 ppm/° C., the selection of which is within the skill of one of ordinary skill in the art. An additional advantage of the low CTE metal fillers is that the particles are conductive, such that the conductivity of the adhesive is not reduced when large quantities of the low CTE filler are added.

The CTE-lowering filler may be in the form of a particulate material separate and distinct from the conductive metal filler. Alternatively, the CTE-lowering filler and the conductive metal filler may together form a composite filler for the adhesive component. The composite filler would advantageously comprise CTE-lowering filler particles coated with the conductive metal. An exemplary composite filler is fused silica coated with silver. One advantage of this composite filler embodiment is that higher volume fractions of filler may be used without degrading the conductivity of the adhesive, since the conduction is occurring from the outside of the particle. On the other hand, when the CTE-lowering filler and the conductive metal filler are separate, distinct particulate materials, the addition of a non-conductive CTE-lowering filler may eventually lower the conductivity of the conductive adhesive. Thus, the composite filler embodiment in which the conductive metal coats non-conductive particles prevents lowering of the conductivity. However, in both embodiments, the effect of lowering the CTE is the same, because the total CTE of the conductive adhesive is based on the volume fractions of the conductive metal, low CTE filler, and adhesive component. While the form of a composite filler may be used in the case of a metal CTE-lowering filler, such as a silver-coated INVAR® filler, the advantages are not appreciated because there is no risk of lowering the conductivity as in the case of a non-conductive low CTE filler. Thus, the composite filler embodiment is particularly beneficial when the CTE-lowering filler is a non-conductive ceramic or glass material.

Advantageously, the amount of the adhesive component in the conductive adhesive is as low as possible, given it contributes the most to the high CTE. Of course, there must be sufficient adhesive component to provide the desired bonding properties for the adhesive, as well as the desirable handling properties, such as viscosity. Advantageously, the fillers are added in amounts as high as possible while still maintaining the desired workability and adhesive force for the conductive adhesive. By way of example and not limitation, the filler content may be as high as about 65 vol. %. Advantageously, the filler materials have an average particle size selected to enable the highest filler loading possible while still maintaining the workability of the adhesive. For example, the average particle size may be in the range of about 0.5–5 mils. The conductive metal filler is present in an amount sufficient to render the desired level of conductivity to the adhesive. By way of example, silver is usually included in an amount of about 25 vol. %. Advantageously, the CTE-lowering filler is present in an amount such that the volume ratio of low CTE filler to conductive metal filler is in the range of about 0.5:1 to about 3.5:1, and more advantageously about 0.5:1 to about 2:1. Examples within the scope of the present invention include 50 vol. % epoxy/25 vol. % silver/25 vol. % glass and 35 vol. % epoxy/15 vol. % silver/50 vol. % glass.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown are described. Accordingly, departures may be made from such details without departing from the scope or spirit of the general inventive concept.

What is claimed is:

1. A feed-through filter capacitor assembly comprising:
    a conductive pin;
    a feed-through filter capacitor comprising a ceramic body having a first coefficient of thermal expansion (CTE), first and second sets of electrode plates and an internal passageway through which the conductive pin passes in conductive relation with the first set of electrode plates; and
    an electrically conductive adhesive in the passageway providing the conductive relation between the conductive pin and first set of electrode plates, the conductive adhesive comprising an organic polymer-based adhesive component having a second CTE greater than the first CTE, a conductive metal filler having a third CTE lower than the second CTE, and a CTE-lowering filler having a fourth CTE lower than the third CTE.

2. The assembly of claim 1 wherein the first CTE is in the range of about 3–15 ppm/° C., the second CTE is at least about 50 ppm/° C., the third CTE is in the range of about 14–20 ppm/° C., and the fourth CTE is less than about 15 ppm/° C.

3. The assembly of claim 1 wherein the adhesive comprises a volume ratio of CTE-lowering filler to conductive metal filler in a range of about 0.5:1 to about 3.5:1.

4. The assembly of claim 3 wherein the ratio is in the range of about 0.5:1 to about 2:1.

5. The assembly of claim 1 wherein the CTE-lowering filler is a particulate material having an average particle size in the range of about 0.5–5 mils.

6. The assembly of claim 1 wherein the CTE-lowering filler and the conductive metal filler together form a particulate material wherein the conductive metal filler forms a coating on the CTE-lowering filler.

7. The assembly of claim 6 wherein particulate material is fused silica coated with silver.

8. The assembly of claim 1 wherein the organic polymer-based adhesive component is silicone.

9. The assembly of claim 1 wherein the organic polymer-based adhesive component is an epoxy.

10. The assembly of claim 1 wherein the conductive metal filler is selected from the group consisting of silver, palladium, platinum, copper, gold, and combinations thereof.

11. There assembly of claim 1 wherein the CTE-lowering filler is selected from the group consisting of barium titanate, alumina, glass, zirconia, quartz, and combinations thereof.

12. There assembly of claim 1 wherein the CTE-lowering filler is fused silica.

13. The assembly of claim 1 wherein the CTE-lowering filler is a binary or ternary alloy of about 30–70% iron and one or a combination of nickel, cobalt and chromium, the alloy having less than about 1% impurity.

14. The assembly of claim 13 wherein the alloy is selected from the group consisting of Fe—30–60Ni, Fe—Ni—Cr, Fe—Ni—Co and Fe—Cr—Co.

15. The assembly of claim 14 wherein the alloy is Fe—36Ni.

16. The assembly of claim 1 further comprising a conductive housing surrounding the ceramic body in conductive relation to the second set of electrode plates and in non-conductive relation to the conductive pin.

17. The assembly of claim 16 further comprising a non-conductive adhesive separating the conductive housing from the conductive pin and conductive adhesive.

18. The assembly of claim 17 wherein the non-conductive adhesive comprises a second organic polymer-based adhesive component having a fifth CTE and a second CTE-lowering filler having a sixth CTE lower than the fifth CTE.

19. The assembly of claim 1 further comprising a non-conductive adhesive in a bottom portion of the passageway, the non-conductive adhesive comprising a second organic polymer-based adhesive component having a fifth CTE and a second CTE-lowering filler having a sixth CTE lower than the fifth CTE.

20. A feed-through filter capacitor assembly comprising:
    a conductive pin;
    a feed-through filter capacitor comprising a ceramic body having a first coefficient of thermal expansion (CTE) in the range of about 3–15 ppm/° C., first and second sets of electrode plates and an internal passageway through which the conductive pin passes in conductive relation with the first set of electrode plates; and
    an electrically conductive adhesive in the passageway providing the conductive relation between the conductive pin and first set of electrode plates, the conductive adhesive comprising an organic polymer-based adhesive component having a second CTE of at least about 50 ppm/° C., a conductive metal filler having a third CTE in the range of about 14–20 ppm/° C., and a CTE-lowering filler having a fourth CTE lower than the third CTE, wherein the conductive adhesive comprises a volume ratio of CTE-lowering filler to conductive metal filler in a range of about 0.5:1 to about 3.5:1.

21. The assembly of claim 20 wherein the ratio is in the range of about 0.5:1 to about 2:1.

22. The assembly of claim 20 wherein the CTE-lowering filler is a particulate material having an average particle size in the range of about 0.5–5 mils.

23. The assembly of claim 20 wherein the CTE-lowering filler and the conductive metal filler together form a particulate material wherein the conductive metal filler forms a coating on the CTE-lowering filler.

24. The assembly of claim 23 wherein particulate material is fused silica coated with silver.

25. The assembly of claim 20 wherein the organic polymer-based adhesive component is silicone.

26. The assembly of claim 20 wherein the organic polymer-based adhesive component is an epoxy.

27. The assembly of claim 20 wherein the conductive metal filler is selected from the group consisting of silver, palladium, platinum, copper, gold, and combinations thereof.

28. There assembly of claim 20 wherein the CTE-lowering filler is selected from the group consisting of barium titanate, alumina, glass, zirconia, quartz, and combinations thereof.

29. There assembly of claim 20 wherein the CTE-lowering filler is fused silica.

30. The assembly of claim 20 wherein the CTE-lowering filler is a binary or ternary alloy of about 30–70% iron and one or a combination of nickel, cobalt and chromium, the alloy having less than about 1% impurity.

31. The assembly of claim 30 wherein the alloy is selected from the group consisting of Fe—30–60Ni, Fe—Ni—Cr, Fe—Ni—Co and Fe—Cr—Co.

32. The assembly of claim 20 wherein the alloy is Fe—36Ni.

33. The assembly of claim 20 further comprising a conductive housing surrounding the ceramic body in conductive relation to the second set of electrode plates and in non-conductive relation to the conductive pin.

34. The assembly of claim 33 further comprising a non-conductive adhesive separating the conductive housing from the conductive pin and conductive adhesive.

35. The assembly of claim 34 wherein the non-conductive adhesive comprises a second organic polymer-based adhesive component having a fifth CTE and a second CTE-lowering filler having a sixth CTE lower than the fifth CTE.

36. The assembly of claim 20 further comprising a non-conductive adhesive in a bottom portion of the passageway, the non-conductive adhesive comprising a second organic polymer-based adhesive component having a fifth CTE and a second CTE-lowering filler having a sixth CTE lower than the fifth CTE.

* * * * *

UNITED STATES PATENT AND TRADEMARK OFFICE
CERTIFICATE OF CORRECTION

PATENT NO. : 6,831,529 B1
DATED : December 14, 2004
INVENTOR(S) : Devoe et al.

It is certified that error appears in the above-identified patent and that said Letters Patent is hereby corrected as shown below:

Column 1,
Line 49, "fccd-through" should be -- feed-through --.
Line 51, please remove "100041".

Column 2,
Line 37, "filter capacitors" should read -- filter capacitor --.
Line 50, "10'is" should read -- 10' is --.

Column 3,
Line 17, "therebetwveen" should read -- therebetween --.
Line 49, "In general, the CTE of ceramics" should read -- In general, the ceramics --.

Column 4,
Line 13, "0.4-0.6 $\mu$ppm/° C" should read -- 0.4-0.6 ppm/° C --.

Column 5,
Line 31, "cpoxy" should read -- epoxy --.
Line 40, "shown are described" should read -- shown and described --.

Column 6,
Lines 20 and 23, "There assembly" should read -- The assembly --.

Column 7,
Lines 22 and 26, "There assembly" should read -- The assembly --.

UNITED STATES PATENT AND TRADEMARK OFFICE
CERTIFICATE OF CORRECTION

PATENT NO. : 6,831,529 B1
DATED : December 14, 2004
INVENTOR(S) : Devoe et al.

It is certified that error appears in the above-identified patent and that said Letters Patent is hereby corrected as shown below:

<u>Column 8,</u>
Line 2, "about 3070%" should read -- about 30-70% --.

Signed and Sealed this

Seventeenth Day of May, 2005

JON W. DUDAS
*Director of the United States Patent and Trademark Office*